United States Patent
Lambach et al.

(10) Patent No.: US 11,414,862 B2
(45) Date of Patent: Aug. 16, 2022

(54) FOAM WALL STRUCTURES AND METHODS FOR THEIR MANUFACTURE

(71) Applicant: Covestro LLC, Pittsburgh, PA (US)

(72) Inventors: James L. Lambach, McMurray, PA (US); Michael F. Palmosina, II, Baden, PA (US)

(73) Assignee: Covestro LLC, Pittsburgh, PA (US)

( * ) Notice: Subject to any disclaimer, the term of this patent is extended or adjusted under 35 U.S.C. 154(b) by 293 days.

(21) Appl. No.: 16/790,022

(22) Filed: Feb. 13, 2020

(65) Prior Publication Data

US 2021/0254332 A1  Aug. 19, 2021

(51) Int. Cl.
| | | |
|---|---|---|
| *E04B 1/74* | (2006.01) | |
| *E04B 2/56* | (2006.01) | |
| *B29C 44/18* | (2006.01) | |
| *E04B 2/54* | (2006.01) | |
| *B32B 5/20* | (2006.01) | |

(52) U.S. Cl.
CPC ............ *E04B 2/562* (2013.01); *B29C 44/186* (2013.01); *E04B 2/54* (2013.01); *B32B 5/20* (2013.01); *B32B 2607/00* (2013.01)

(58) Field of Classification Search
CPC .......... E04B 2/562; E04B 2/54; B29C 44/186
See application file for complete search history.

(56) References Cited

U.S. PATENT DOCUMENTS

| | | |
|---|---|---|
| 2,009,619 A | 7/1935 | Huffine |
| 2,030,157 A | 2/1936 | Cumpston |
| 2,055,032 A | 9/1936 | Degian |
| 2,271,929 A | 2/1942 | Venzie |
| 2,745,779 A | 5/1956 | Ritter |
| 2,780,090 A | 2/1957 | Rasmussen |
| 3,619,437 A | 11/1971 | McDonald, Jr. |
| 4,236,361 A | 12/1980 | Boden |
| 4,292,775 A | 10/1981 | Howard |
| 4,443,988 A | 4/1984 | Coutu, Sr. |
| 4,471,591 A | 9/1984 | Jamison |
| 4,653,243 A * | 3/1987 | Burkett .................. C04B 28/02 427/244 |
| 4,671,038 A | 6/1987 | Porter |
| 4,765,105 A | 8/1988 | Tissington et al. |
| 4,786,547 A | 11/1988 | St-Michel |
| 4,856,244 A | 8/1989 | Clapp |
| 4,885,886 A | 12/1989 | Rosso |

(Continued)

FOREIGN PATENT DOCUMENTS

| | | |
|---|---|---|
| DE | 202014004695 U1 | 7/2014 |
| IE | 20050080 A1 | 8/2006 |

(Continued)

OTHER PUBLICATIONS

Oertel, Guenther, Polyurethane Handbook (2nd Edition), 1994, p. 276.

*Primary Examiner* — Basil S Katcheves
(74) *Attorney, Agent, or Firm* — Donald R. Palladino

(57) ABSTRACT

Foam wall structures and methods for making them are described. The wall structures include a frame, a mesh mechanically fastened to a front surface of the frame, a foam panel at least partially abutting and overlying the mesh, and a foam layer disposed in a cavity defined by the frame, the mesh, and the foam panel. Buildings that include such wall structures are also described.

20 Claims, 4 Drawing Sheets

(56) References Cited

U.S. PATENT DOCUMENTS

| | | | |
|---|---|---|---|
| 5,353,560 A | 10/1994 | Heydon | |
| 5,389,167 A | 2/1995 | Sperber | |
| 5,417,023 A | 5/1995 | Mandish | |
| 5,724,783 A * | 3/1998 | Mandish | E04B 2/58 |
| | | | 52/404.3 |
| 5,950,386 A | 9/1999 | Shipman et al. | |
| 5,950,389 A | 9/1999 | Porter | |
| 5,953,883 A | 9/1999 | Ojala | |
| 5,979,131 A | 11/1999 | Remmele et al. | |
| 6,085,479 A | 7/2000 | Carver | |
| 6,205,729 B1 | 3/2001 | Porter | |
| 6,308,491 B1 | 10/2001 | Porter | |
| 6,314,695 B1 * | 11/2001 | Belleau | E04F 21/08 |
| | | | 427/403 |
| 6,332,304 B1 | 12/2001 | Fuhrman | |
| 6,408,594 B1 | 6/2002 | Porter | |
| 6,438,915 B1 | 8/2002 | Beauboeuf | |
| 6,481,172 B1 | 11/2002 | Porter | |
| 6,715,249 B2 | 4/2004 | Rusek | |
| 7,036,284 B1 | 5/2006 | Larson | |
| 7,168,216 B2 * | 1/2007 | Hagen, Jr. | B29C 44/186 |
| | | | 52/404.3 |
| 8,635,778 B1 | 1/2014 | Hagaman | |
| 8,857,116 B2 * | 10/2014 | Henriquez | E04B 1/161 |
| | | | 52/506.05 |
| 8,959,862 B1 | 2/2015 | Kreizinger | |
| 9,145,688 B2 | 9/2015 | Hunt-Hansen | |
| 9,562,359 B1 * | 2/2017 | Grisolia | E04F 13/04 |
| 9,624,666 B2 * | 4/2017 | Singleton | E04B 2/58 |
| 9,938,711 B2 | 4/2018 | Grisolia et al. | |
| 10,006,198 B2 | 6/2018 | Parsons et al. | |
| 10,294,668 B2 | 5/2019 | Kreizinger | |
| 10,301,823 B2 | 5/2019 | Kreizinger | |
| 10,370,849 B2 | 8/2019 | Lambach et al. | |
| 10,415,244 B2 | 9/2019 | Giles et al. | |
| 2002/0012785 A1 | 1/2002 | Leduc | |
| 2002/0108320 A1 | 8/2002 | Weiss | |
| 2002/0129577 A1 | 9/2002 | Weiss | |
| 2003/0041544 A1 | 3/2003 | Rusek et al. | |
| 2004/0016194 A1 | 1/2004 | Stefanutti et al. | |
| 2004/0200171 A1 | 10/2004 | Schilger | |
| 2005/0055973 A1 | 3/2005 | Hagen et al. | |
| 2005/0106360 A1 | 5/2005 | Johnston et al. | |
| 2005/0188649 A1 | 9/2005 | Hagen | |
| 2005/0247021 A1 | 11/2005 | Schauffele | |
| 2006/0026925 A1 | 2/2006 | Layfield | |
| 2007/0094963 A1 | 5/2007 | McDonald et al. | |
| 2008/0016802 A1 * | 1/2008 | Rheaume | E04C 2/26 |
| | | | 52/220.1 |
| 2009/0098357 A1 | 4/2009 | Bergtold et al. | |
| 2009/0320397 A1 | 12/2009 | Hansbro et al. | |
| 2010/0011701 A1 | 1/2010 | Cole et al. | |
| 2010/0043327 A1 | 2/2010 | Rothwell | |
| 2010/0095613 A1 | 4/2010 | Paetkau et al. | |
| 2011/0078971 A1 * | 4/2011 | Adams | E04B 1/762 |
| | | | 52/517 |
| 2011/0138724 A1 | 6/2011 | Olang | |
| 2011/0173911 A1 | 7/2011 | Propst | |
| 2011/0214374 A1 | 9/2011 | Propst | |
| 2012/0011792 A1 | 1/2012 | Dewildt et al. | |
| 2012/0028563 A1 | 2/2012 | Sacks et al. | |
| 2012/0096785 A1 | 4/2012 | Weeks | |
| 2012/0159765 A1 | 6/2012 | Propst | |
| 2012/0240501 A1 | 9/2012 | Spiegel | |
| 2012/0247040 A1 | 10/2012 | Buoni et al. | |
| 2013/0104469 A1 | 5/2013 | Fay | |
| 2013/0104480 A1 | 5/2013 | Smith | |
| 2013/0305643 A1 * | 11/2013 | Singleton | E04C 2/46 |
| | | | 52/404.1 |
| 2013/0312350 A1 | 11/2013 | Kreizinger | |
| 2014/0053486 A1 | 2/2014 | Leonard et al. | |
| 2014/0115991 A1 | 5/2014 | Sievers et al. | |
| 2014/0250827 A1 | 9/2014 | Gillman | |
| 2014/0265027 A1 | 9/2014 | Kreizinger | |
| 2015/0111001 A1 | 4/2015 | Sagnard et al. | |
| 2015/0140243 A1 | 5/2015 | Sagnard et al. | |
| 2016/0326740 A1 * | 11/2016 | Parsons | E04B 2/707 |
| 2017/0030074 A1 | 2/2017 | Ndobo-Epoy et al. | |

FOREIGN PATENT DOCUMENTS

| | | |
|---|---|---|
| JP | 5546961 A | 4/1980 |
| JP | 56000437 A | 1/1981 |
| JP | 60108609 U | 7/1985 |
| JP | 3115643 A | 5/1991 |
| JP | 11200521 A | 7/1999 |
| JP | 2008132676 A | 6/2008 |
| JP | 3159655 U | 5/2010 |
| JP | 2013091246 A | 5/2013 |
| WO | 9914442 A1 | 3/1999 |
| WO | 9929978 A1 | 6/1999 |

* cited by examiner

FOAM WALL STRUCTURES AND METHODS FOR THEIR MANUFACTURE

FIELD

The inventions described in this specification relate to foam wall structures that can exhibit a favorable combination of shear strength and ductility.

BACKGROUND

Relatively recently, insulated wall structures satisfying strict industry insulation requirements have been developed that can be made without excessive material and labor costs. According to one proposal, a foam wall structure includes a foam panel, such as a faced polyisocyanurate panel, attached to at least a portion of a front frame surface, such that the faced polyisocyanurate panel and frame members define one or more voids within the frame; and a foam layer received within at least a portion of one of the voids within the frame, wherein the foam layer adheres to at least a portion of the faced polyisocyanurate panel.

Such foam wall structures can provide many benefits. They can exhibit high racking shear strength and excellent thermal resistance. Moreover, they can be fabricated in a controlled, possibly highly automated, manufacturing facility that is away from the construction site, thus increasing the likelihood of consistent results/performance, all while reducing labor and material costs.

Particularly in regions prone to seismic activity, however, it is desirable that wall structures, in addition to exhibiting excellent racking shear strength, also behave in a ductile manner. This means that after a shear failure of the wall, the wall continues to absorb energy and does not collapse. The extent of wall ductility can be evaluated by measuring the distance in which a wall can be displaced laterally before the racking shear strength of the wall falls below some predetermined value, with a greater displacement distance reflecting greater wall ductility.

The inventions described in this specification were made in view of the foregoing.

SUMMARY

In certain respects, the specification relates to wall structures. These wall structures comprise: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a mesh mechanically fastened to the front frame surface; (c) a foam panel that abuts the mesh and overlies the mesh, wherein the foam panel, the mesh, the first member, the second member, and the connecting members define a cavity; and (d) a foam layer disposed within the cavity, wherein the foam layer penetrates the mesh and adheres to the foam panel.

In other respects, this specification relates to methods for manufacturing wall structures. The methods comprise: (a) mechanically fastening a mesh to a front surface of a frame, wherein the front frame surface is formed by a front surface of a first member, a front surface of a second member that is spaced apart from the first member, and a front surface of connecting members extending between the first member and the second member; (b) orienting a foam panel so that the foam panel abuts and overlies the mesh the mesh so that the foam panel, the mesh, the first member, the second member, and the connecting members define a cavity; and (c) depositing a foam-forming material into the cavity so that the foam-forming material that forms a foam layer that penetrates the mesh and adheres to the rear surface of the foam panel.

The present specification also relates, among other things, buildings comprising such wall structures.

BRIEF DESCRIPTION OF THE DRAWINGS

Various features and characteristics of the inventions described in this specification may be better understood by reference to the accompanying figures, in which.

Figure 1:
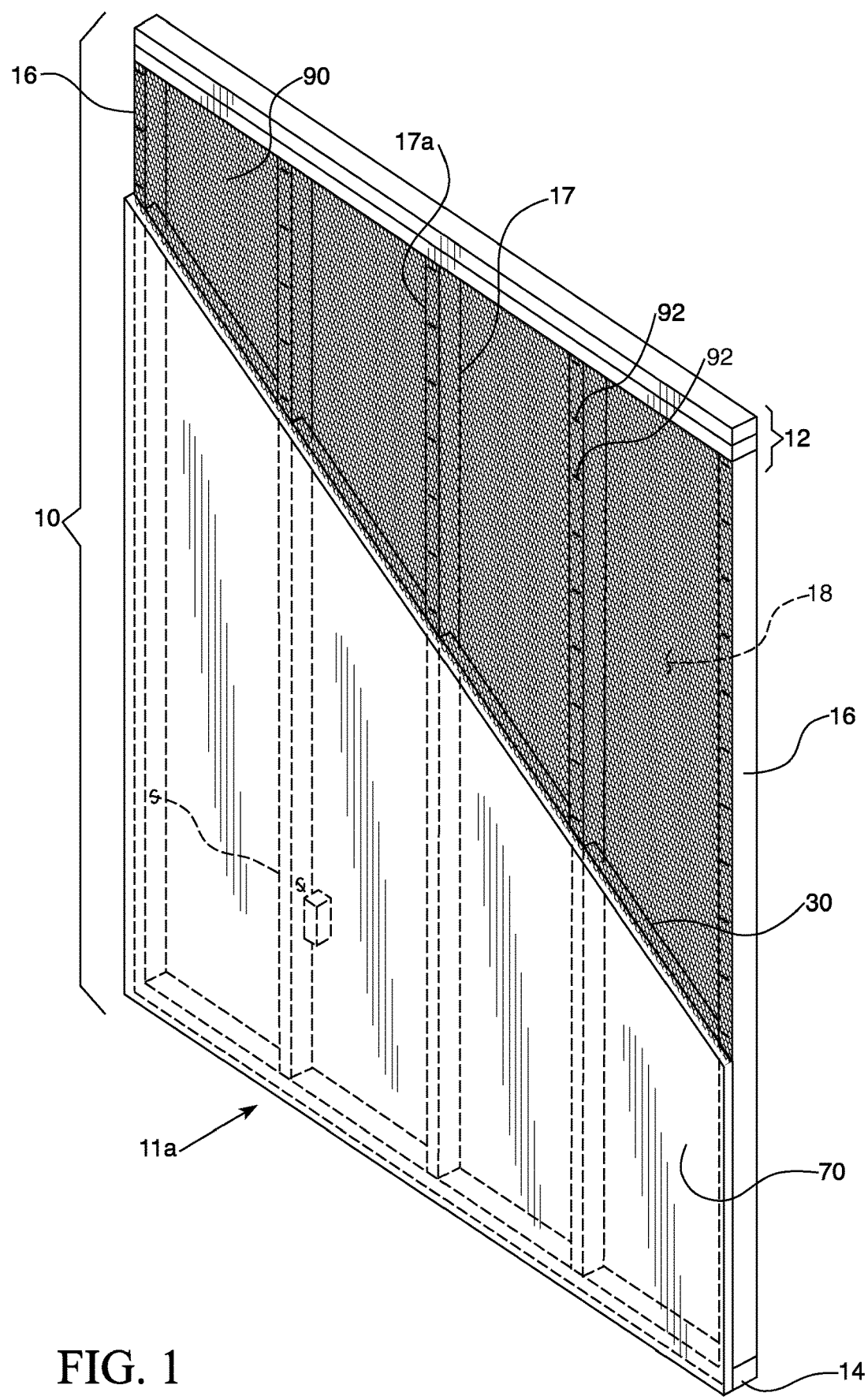
FIG. 1 is a front perspective view of an embodiment of a wall structure of this specification.
Figure 2:
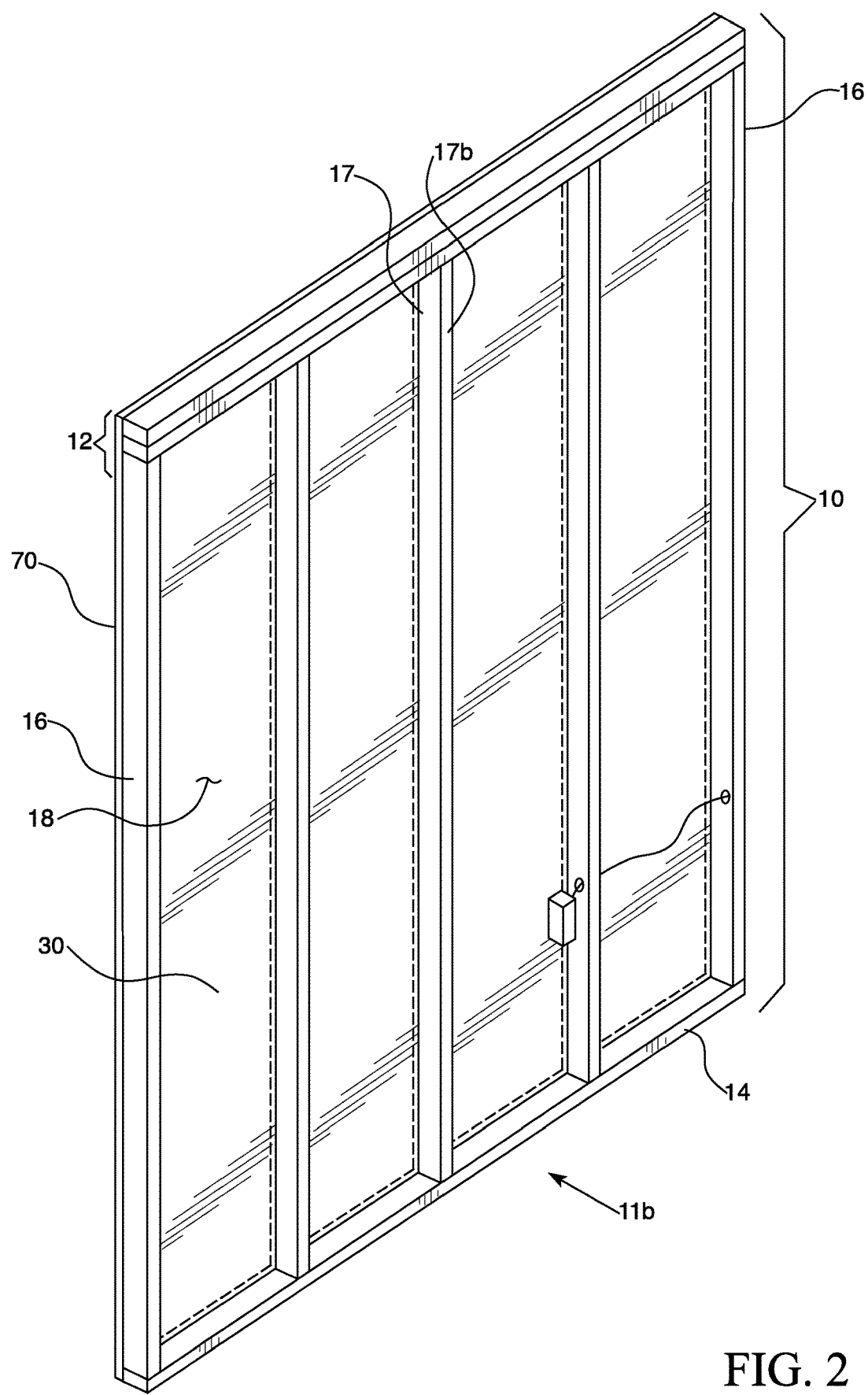
FIG. 2 is a rear perspective view of the foam wall structure of FIG. 1.
Figure 3:
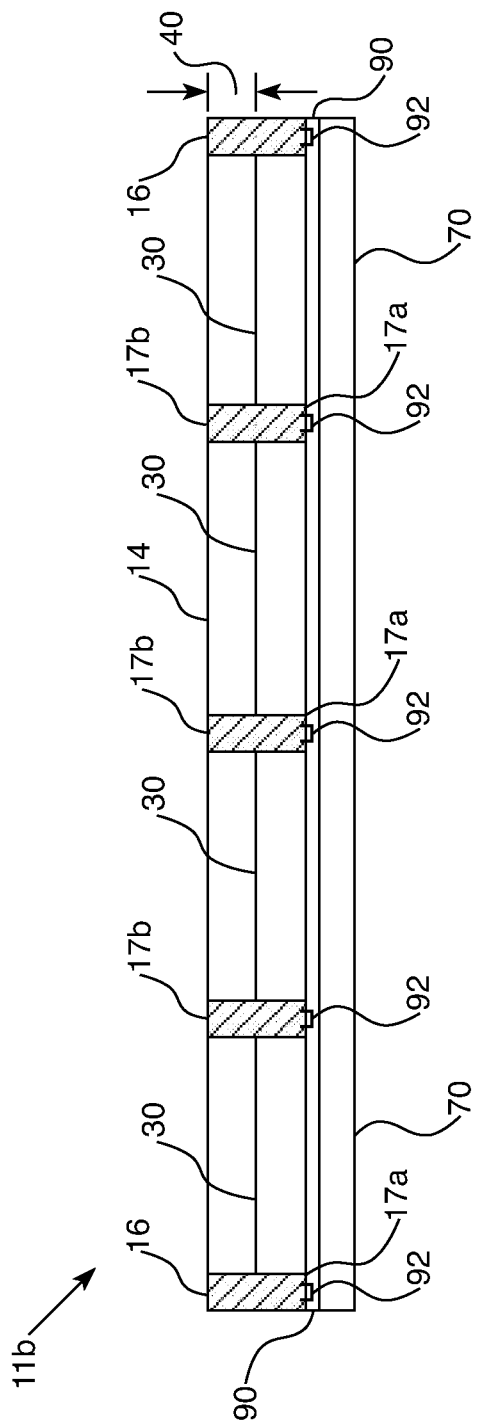
FIG. 3 is a top cross-sectional view of the foam wall structure of FIG. 1.
Figure 4:
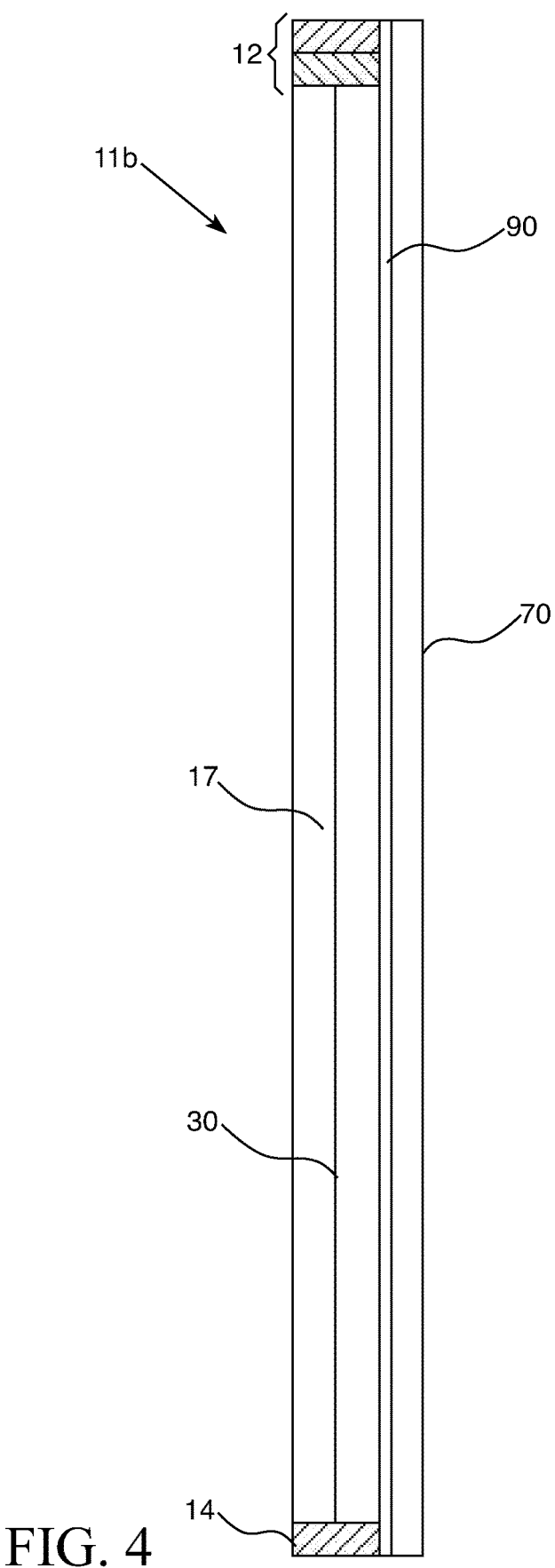
FIG. 4 is a side cross-sectional view of the foam wall structure of FIG. 1.

The reader will appreciate the foregoing features and characteristics, as well as others, upon considering the following detailed description of the inventions according to this specification.

DETAILED DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

The present specification is directed to wall structures, methods for their manufacture, and use of such structures as a wall in a building. Referring to the Figures, a wall structure 10 comprises frame 11. The frame 11 comprises a first member 12, a second member 14 spaced apart from the first member 12, and connecting members (such as the two side members and primary support member) 16, 17 extending between the first member 12 and the second member 14. As used herein, the term "connecting member" refers to a member that connects first member 12 with second member 14 and includes side members 16 and primary support members 17. The first member 12, the second member 14, and the connecting members 16, 17 each comprise a front surface and a rear surface that collectively form a front frame surface 11a and a rear frame surface 11b. The constituent members (12, 14, 16, and 17) of the frame 11 can be made out of a suitable material of construction such as wood. For example, the constituent members (12, 14, 16 and 17) of the frame 11 can comprise wooden 2×4 members (i.e., structural members made of wood having nominal thicknesses of about 2-inches, nominal widths of about 4-inches, and suitable lengths) secured together with fasteners such as nails, nail plates, screws, staples, bolts, or rivets, or a combination of any thereof.

A mesh 90 overlies the front frame surface 11a and is mechanically fastened to the front frame surface 11a. As used in this specification, the term "overlie" means that the structure or component being discussed is oriented in front of the structure or component it is being compared to, i.e., the structure or component being discussed is oriented nearer to the outside direction of an exterior wall of a building than the structure or component it is being compared to.

In addition to overlying the front frame surface 11a, the mesh 90 may also abut the front frame surface 11a. As used herein, "abut", when used with reference to the mesh 90 abutting the front frame surface 11a, means that the mesh 90 touches the front frame surface 11a so that the mesh 90 is not spaced apart from the front frame surface 11a.

As used in this specification, the term "mesh" refers to an element that has a network structure comprising a plurality interlacing solid parts with regularly spaced apertures. Meshes suitable for use herein include those made of a metal or alloy, nylon or another thermoset polymer, a thermoplastic polymer such as polyethylene, an organic or inorganic woven or non-woven material, or any material capable of operating as a screen, i.e., of sufficient porosity, whereby some of the foam layer (described below) penetrates through the apertures of the mesh.

In some implementations, the mesh 90 comprises an expanded metal (such as carbon steel, galvanized steel, stainless steel, aluminum or another metal), metal wire cloth (either woven or welded wires made of carbon steel, galvanized steel, stainless steel, or another metal), glass fibers, or plastic, though other materials can be readily envisioned. The apertures may be, for example, of a square, diamond, rhombus, or hexagonal pattern. For example, in some implementations, the mesh has a thickness of 0.005 to 0.2 inch (0.127 to 5.08 millimeters), such as 0.01 to 0.1 inch (0.254 to 2.54 millimeters) or 0.02 to 0.05 inch (0.508 to 1.27 millimeters). The apertures of the mesh 90, in some implementations, have a size of 0.25 to 1 inch (6.35 to 25.4 millimeters), such as 0.25 to 0.75 inch (6.35 to 19.05 millimeters) in the longest-dimension thereof. Thus, as will be appreciated, in some implementations, the width and/or height of the apertures of the mesh 90 are larger than the thickness of the mesh 90.

The mesh 90 is mechanically fastened to the front frame surface 11a. The mesh 90 can be mechanically fastened to any of the front faces (12a, 14a, 16a and/or 17a) of the constituent members (12, 14, 16 and 17) of the frame 11. For example, the mesh 90 can be mechanically fastened to the front faces 12a and 14a of the first and second members 12 and 14 and/or to the front faces 16a, 17a of the connecting members 16, 17 extending therebetween. The mesh 90 can be mechanically fastened to the front frame surface 11a with mechanical fasteners 92. "Mechanical fasteners", as will be appreciated, refers to fasteners that rely on some mechanical principle (i.e. not adhesives) and are semi-permanent (i.e. unlike clamps). Attachment mechanical fasteners can include, but are not limited to, nails, staples, screws, bolts, or rivets, or a combination of any thereof.

As indicated, an aspect of the wall structure of this specification is that mesh 90 is mechanically fastened to the front frame surface 11a. Thus, mesh 90 is not merely only placed between the front frame surface 11a and the foam panel 70, to be subsequently held in place by the penetrating foam layer 30. Rather, by mechanically fastening mesh 90 flat against the front frame surface 11a it's easier to position the polyiso board flat against the front frame surface 11a and attach it to the front frame surface 11a. This can be particularly important because if the polyiso board is not in close contact to the framing, and not held close to the frame while the spray foam is being applied, it can expand and push the board out further, and then cure in that conformation. Much of the foam in the interfacial area can leak across the interface, either into another cavity, or if at a perimeter location, the foam extrudes and must be removed. This is time consuming and wasteful. In addition, the polyiso board side of the panel loses its flatness because the polyiso board has been pushed out, either by the mesh, or exacerbated by expanding foam in the interface. Now panels don't line up with one another, and the sight line along a series of panels can be wavy or offset, thereby impacting the ability to attach exterior cladding in the same plane along the sight line of a wall at the job site.

According to the wall structures of this specification, a foam panel 70 abuts mesh 90 and overlies the mesh 90. As used herein, "abut", when used with reference to the foam panel 70 "abutting" the mesh 90, means that the foam panel 70 at least partially touches the mesh 90 so that at least some of portion of the foam panel 70 is not spaced apart from the mesh 90. In other words, the foam panel 70 at least partially directly overlies mesh 90 with no gap between them. As used herein, "overlie" means that a component is at least partially disposed towards the front of the wall structure relative to another component. Thus, foam panel 70 is at least partially disposed towards the front of wall structure 10 relative to mesh 90.

As will be appreciated, therefore, it is not necessary and, in fact in many cases, the foam layer 30, while penetrating the mesh 90 and adhering to foam panel 70, does not necessarily encapsulate all or any of mesh 90. For example, in some implementations, foam panel 70 abuts mesh 90 at the portions of foam panel 70 that overlie frame members 12, 14, 16 and/or 17. Foam panel 70 may also abut mesh 90 at portions of foam panel 70 that overlie cavity 18 however, in some of these cases, at least some of foam panel 90 may not abut mesh 90 at portions of foam panel 70 that overlie cavity 18, due to fact that mesh 90 may, and often is, itself flexible and may not lie perfectly straight over cavity 18 as is depicted in the Figures.

By abutting foam panel 70 against mesh 90 as described herein, the wall structures of this specification are easy to assemble. Moreover, and importantly, this enables the wall structures described herein to be of essentially the same thickness as other adjacent wall structures that may be employed in the building, such adjacent wall structures not employing the use of a mesh because it may not be necessary. As a result, it is possible to maintain a constant wall thickness relative to other wall structures used in the building, which is typically highly desirable.

As a result, this specification is also directed to buildings comprising adjacent wall structures. These buildings comprise: (1) a first wall structure comprising: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a mesh mechanically fastened to the front frame surface; (c) a foam panel that abuts and overlies the mesh, wherein the foam panel, the mesh, the first member, the second member, and the connecting members define a cavity; and (d) a foam layer disposed within the cavity, wherein the foam layer penetrates the mesh and adheres to the foam panel; and (2) a second wall structure disposed adjacent to the first wall structure, wherein (i) the second wall structure does not include a mesh fastened to a front frame surface, and (ii) the thickness of the first wall structure is substantially the same as the thickness of the second wall structure. In some of these implementations, the second wall structure comprises: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel fastened to at least a portion of the front frame surface, wherein the foam panel, the first member, the second member, and the connecting members define a cavity; and (d) a foam layer disposed within the cavity, wherein the foam layer adheres to the foam panel. As used herein, "substantially the same", when used with reference to the thickness of wall structures, means that the difference in the thickness of the wall structures being compared is not more than 0.2 inch (5.08 millimeters), such as no more than 0.1 inch (2.54 millimeters) or no more than 0.05 inch (1.27 millimeters). In some implementations, the second wall structure is a foam wall structure as described in U.S. Pat. No. 10,370,849 at col. 5, line 25 to col. 10, line 2, the cited portion of which being incorporated herein by reference.

As used in this specification, the term "foam panel" refers to panels comprising foam, such as, for example, polyisocyanurate (sometimes referred to as "polyiso") foam panels, expanded polystyrene foam panels, and extruded polystyrene foam panels. As will be appreciated, such foam panels have relatively low fastener pull-out strength as compared to wood panels, plywood panels, and OSBs. Accordingly, "foam panel" as used in this specification, is to be distinguished from wood panels, plywood panels, and OSBs, for example. As used herein, "foam" refers to a substance that is formed by trapping pockets of gas in a liquid or solid. In certain embodiments, the foams described in this specification are "closed-celled" foams. The term "closed-celled foam", as used in this specification, means that the foam has a closed cell content of at least 80%, sometimes at least 90%, when measured according to ASTM D6226-15, which is incorporated herein by reference. In certain embodiments, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "panel", as used in this specification, refers to a solid, relatively thin and flat slab of material, which in some cases, has a rectangular or square shape. In some embodiments, the foam panels described herein have a thickness of no more than 2 inches (5.08 cm), such as a thickness of 1 to 2 inches (2.54 to 5.08 cm) or 1 to 1.5 inches (2.54 cm to 3.81 cm).

The foam panel 70 attached to the front frame surface 11a can comprise a facer on a rear face and/or a front face of a core foam layer. Thus, as will be appreciated, in these implementations, it is a facer on the rear face of the core foam layer of the foam panel 70 that abuts and overlies mesh 90.

For example, the foam panel 70 may comprise a polyiso panel comprising a polyisocyanurate foam core layer and a facer attached to a front face and/or a rear face of the polyisocyanurate foam core layer. In certain implementations, the facer is attached to and substantially covers both sides (the front and rear faces) of a polyisocyanurate foam core layer or other foam core layer. For example, facers can comprise glass mats filled with recycled cardpanel and colored with carbon black. Facers can also comprise foil or foil/glass composites. Facers can also comprise fibrous materials such as fiberglass materials or other fiber-reinforced sheet-like materials. Examples of suitable facers include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso panel or other type of foam panel comprises a facer on both the front and rear faces of the polyisocyanurate foam layer or other core layer, then the facer on the front face may be the same as or may be different than the facer on the rear face. In some implementations, the facer acts as a water-resistant barrier. In some implementations, the facer meets the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012), which are each incorporated by reference into this specification. For embodiments in which the foam panel comprises a polyiso panel, the foam panel may meet the requirements of ASTM C1289-15: Standard Specification for Faced Rigid Cellular Polyisocyanurate Thermal Insulation Panel, which is incorporated by reference into this specification.

The foam panel 70 is fastened to the front frame surface 11a. The foam panel 70 can be fastened to any of the front faces (12a, 14a, 16a and/or 17a) of the constituent members (12, 14, 16 and 17) of the frame 11. For example, the foam panel 70 can be attached to the front faces 12a and 14a of the first and second members 12 and 14 and to the front faces 16a, 17a of the connecting members 16, 17 extending therebetween. The foam panel 70 can be attached to the front frame surface 11a with fasteners and/or an adhesive (not shown). Mechanical fasteners can include, but are not limited to, nails, staples, screws, bolts, or rivets, or a combination of any thereof. Attachment adhesives can comprise a construction adhesive that is compatible with the adjoining materials. For example, an adhesive used to fasten a foam panel to a frame can comprise a foam material (which may be the same foam material or a different foam material as the foam material comprising the foam layer, described below).

The foam panel 70, the first member 12, the second member 14, and the connecting members 16, 17 define a cavity within the frame 11. A foam layer 30 is located within the cavity. The foam layer 30 adheres to the foam panel 70 and covers at least a portion of the rear surface of the foam panel 70. In certain implementations, the foam layer 30 does not extend out from and/or overlie the front frame surface 11a.

The foam layer 30 can comprise, for example, polyurethane, polyurea, or polyisocyanurate, or a mixture thereof. The foam layer 30 can be substantially free, essentially free, or completely free of halogen-containing flame retardant additives.

Examples of foam materials include, but are not limited to, foams made with polyurethane, polyurea, polyisocyanurate (also referred to as polyiso), and mixtures thereof. Foam materials (including the foam layer 30) may be substantially free, may be essentially free, or may be completely free of halogen-containing flame retardant additives. The term "halogen" refers to the halogen elements, which include fluorine, chlorine, bromine, and iodine, and the term "halogen-containing flame retardant additives" refers to a substance that may be used to inhibit or resist the spread of fire, and which contains halogen groups such as a fluoro, chloro, bromo, and/or iodo groups. Further, the term "substantially free," as used in this specification, means the foam material contains less than 1000 parts per million (ppm), "essentially free" means less than 100 ppm, and "completely free" means less than 20 parts per billion (ppb) of halogen-containing flame retardant additives.

In certain embodiments, the foam layer 30 has a fairly high density. More particularly, in certain embodiments, the density of the foam layer 30 is at least 2.8 lb/ft$^3$ (44.9 kg/m$^3$), such as 2.8 to 4.0 lb/ft$^3$ (44.9 to 64.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

As illustrated in the Figures, in some embodiments the foam layer 30 comprises a thickness extending from the rear surface of the foam panel 70 to a position intermediate the front frame surface 11a and the rear frame surface 11b. In this manner, a gap 40 may be formed within the frame 11 between a rear surface of the foam layer 30 and the rear frame surface 11b. Although the Figures show the foam layer 30 comprising a thickness extending from the rear surface of the foam panel 70 to a position intermediate the front frame surface 11a and the rear frame surface 11b, it is understood that the foam layer 30 can alternatively comprise a thickness extending from the rear surface of the foam panel 70 to the rear frame surface 11b, in which case there may be no gap formed within the frame 11 between the rear surface of the foam layer 30 and the rear frame surface 11b. In some embodiments, gap 40 has a width, from the rear surface of the foam layer to the rear frame surface 11b, of at least 1 inch (2.54 cm), such as 1 to 2 inches (2.54 to 5.08 cm) or 1.5 to 2 inches (3.81 to 5.08 cm).

This specification also relates to methods for manufacturing the foam wall structures described herein. The methods comprise mechanically fastening a mesh to a front surface of a frame, wherein the front frame surface is formed by a front surface of a first member, a front surface of a second member that is spaced apart from the first member, and a front surface of connecting members extending between the first member and the second member.

For example, in some implementations, a mesh 90 can be mechanically fastened to the front frame surface 11a while the frame 11 is positioned substantially horizontally, such as where the frame 11 is positioned on a framing table where the frame 11 may be constructed. As used herein, the phrase "substantially horizontal" when used with reference to the position of the frame when the foam panel is attached means that the longest dimension of each of the frame members 12, 14, 16 and 17 is positioned generally horizontally, though modest deviations from true horizontal of to 30°, in some cases up to 20° or up to 10° are also encompassed by the term "substantially horizontal".

The framing table may hold the frame members in the required position while the framing members are attached to each other, using suitable fasteners. A framing table can be highly suitable for ensuring that the frame members are attached to each other at the perpendicular and parallel positions to each other (if desired) and therefore can also ensure that the mesh 90 and foam panel 70 when attached to the frame 11 are also installed in the same plane. This means that the surfaces 12a, 14a, 16a, 17a, are in the same plane and flat and flush so that the gap between these surfaces and the mesh 90 and the foam panel 70 is minimized; making it easier to attach the mesh 90 and foam panel 70 in the desired position on the frame 11.

In certain implementations, after ensuring correct attachment of the framing members, the frame 11 may, if desired, be moved on to a tilting device, such as a tiltable platform. Such a tilting device receives the frame 11 in a substantially horizontal position and is capable of placing the frame 11 having the mesh 90 and foam panel 70 fastened thereto on a conveyor configured to convey the frame 11 having the mesh 90 and foam panel 70 fastened thereto in a substantially upright position. In some embodiments, frame 11 may rest on a tiltable platform that is oriented substantially horizontally while the mesh 90 and the foam panel 70 are fastened to the front frame surface 11a of the frame 11.

In the methods of this specification, the mesh 90 is mechanically fastened to the front frame surface 11a. The mesh 90 can be mechanically fastened to any of the front faces (12a, 14a, 16a and/or 17a) of the constituent members (12, 14, 16, and 17) of the frame 11. For example, the mesh 90 can be mechanically fastened to the front faces 12a and 14a of the first and second members 12 and 14 and/or to the front faces 16a, 17a of the connecting members 16, 17 extending therebetween. The mesh 90 can be mechanically fastened to the front frame surface 11a with mechanical fasteners 92 (see the Figures). Attachment fasteners can include, but are not limited to, nails, staples, screws, bolts, or rivets, or a combination of any thereof.

In some implementations, the mesh 90 is mechanically fastened to the front frame surface 11a by using mechanical fasteners 92, such as staples, as depicted in the Figures.

According to the methods of this specification a foam panel 70 is oriented so as to abut the mesh 90 and to overlay the mesh 90 so that the foam panel 70, the mesh 90, the first member 12, the second member 14, and the connecting members 16, 17 define a cavity.

In some implementations, the methods comprise fastening the foam panel 70 to the front frame surface 11a of, for example, a substantially horizontally positioned frame. As described above with respect to mesh 90, a foam panel 70 can be fastened to the front frame surface 11a having mesh 90 mechanically fastened thereto, while the frame 11 is positioned substantially horizontally, such as where the frame 11 is on a framing table where the frame 11 may be constructed.

In certain implementations of the methods of this specification, the foam panel 70 is attached to the front frame surface 11a, which has mesh 90 mechanically fastened thereto. The foam panel 70 abuts the mesh 90 and overlies the mesh 90 and is fastened to any of the front faces (12a, 14a, 16a and/or 17a) of the constituent members (12, 14, 16, and 17) of the frame 11. For example, the foam panel 70 can be fastened to the front faces 12a and 14a of the first and second members 12 and 14 and/or to the front faces 16a, 17a of the connecting members 16, 17 extending therebetween. The foam panel 70 can be fastened to the front frame surface 11a with fasteners and/or an adhesive (not shown). Attachment fasteners can include, but are not limited to, nails, staples, screws, bolts, or rivets, or a combination of any thereof. Attachment adhesives can comprise a construction adhesive that is compatible with the adjoining materials. For example, an adhesive used to fasten a foam panel to a frame can comprise a foam material (which may be the same foam material or a different foam material as the foam material comprising the foam layer, described below). Because foam panel 70 may comprise polyisocyanurate foam or foams having relatively low fastener pull-out strength, care should be used when mechanically fastening a foam panel 70 to frames so as not to damage the foam panels.

In certain implementations, the foam panel 70 is attached to the front frame surface 11*a* by using fasteners, such as SCRAIL® collated nails (commercially available from FASCO America®, Muscle Shoals, Alabama) equipped with a continuous rigid insulation washer (a "CI washer"). Alternatively, the foam panel 70 can be fastened to the front frame surface by the use of one or more adhesives selected from latex-based adhesives, reactive hot melts, polyester adhesives, polyamide adhesives, acrylic adhesives, one-component epoxy-based adhesives, one-component polyurethane-based adhesives, two-component polyurethane-based adhesives, and combinations of any thereof. Also, as described below, a foam material may be used as the adhesive. For example, a layer of foam may be applied to the foam panel 70, the front frame surface 11*a*, or both, before positioning and attaching the foam panel 70 to the front frame surface 11*a*.

The foam panel 70 fastened to the frame 11 may comprise multiple separate foam panels (i.e., multiple sections) which may be joined together by tape (such as is described below) or caulk or polyurethane foam at this stage or later in the process.

The methods of this specification comprise depositing a foam-forming material into the cavity so that the foam-forming material penetrates the mesh 90 and adheres to the rear surface 70*b* of the foam panel 70.

In some implementations, this step of the methods described herein comprises placing the frame 11 having the mesh 90 and foam panel 70 fastened thereto on a conveyor, such as a track conveyor that is configured to convey the frame 11 having the mesh 90 and foam panel 70 fastened thereto in a substantially upright position. As used herein, the term "track conveyor" refers to a device configured to convey frame 11 of a wall structure 10 in a substantially upright position and that includes at least one, in some cases more than one, track (or line) along which the frame 11 of a wall structure can travel and upon which the wall structure 10 can rest. The tracks included in the track conveyor utilized in the methods described in this specification can comprise any of a variety of devices to facilitate conveyance of a wall structure 10 along the track(s) in a substantially upright position, such as rollers, balls, bearings, wheels, and belts, among other devices. In some embodiments, however, the tracks of the track conveyor comprise a plurality of rotating members, such as balls (sometimes referred to as ball bearing rollers) or wheels in which the track includes a plurality of such rotating members, i.e., circular objects that revolve on an axle and upon which the frame 11 lies while being conveyed, and which are disposed along the length of the track.

In some implementations, the frame 11 having the foam panel 70 attached thereto may be placed on a track conveyor by tilting the frame 11 from a substantially horizontal position to a substantially upright position in which frame member rests on a substantially vertically positioned track of the conveyor. An example of such a track conveyor, which is suitable for use in the methods of this specification, is described in U.S. Pat. No. 10,227,779 at col. 10, line 24 to col. 12, line 60, the cited portion of which being incorporated herein by reference.

In these implementations, the frame 11 is, in some embodiments, placed on conveyor in a substantially upright position in which rear frame surface 11*b* faces away from substantially horizontally positioned track(s) of the track conveyor, so that it is completely exposed (i.e., there is no component or device between a spray foam applicator and the rear frame surface 11*b*, which allows for easy spray foam application over the entire wall structure, as described below), whereas front frame surface 11*a* faces towards, and may be in direct contact with, substantially horizontally positioned track(s).

The track conveyor used in some implementations of the methods of this specification is configured to convey a frame 11 of a wall structure 10 in a substantially upright position. As used herein, "substantially upright position" when used with reference to the conveyance of a frame 11 of a wall structure means that the longest dimension of at least one of the frame members 12, 14, 16 and 17 is positioned generally perpendicular to the direction of gravity but not exactly perpendicular to the direction of gravity. For example, in some cases "substantially vertical" in this context means that the longest dimension of at least one of the frame members 12, 14, 16 and 17 is positioned at a slope of 75° to 88° from the direction of gravity, such as 78° to 88° from the direction of gravity, or, in some cases, 80° to 86° or 81° to 85° from the direction of gravity.

Some implementations of the methods of this specification comprise conveying the frame 11 having the mesh 90 fastened thereto and foam panel 70 abutting and overlying mesh 90 on the track conveyer, in a substantially upright position, to a spray foam application station where a foam-forming material is spray applied into the cavity so that the foam-forming material penetrates the mesh 90 and adheres to the rear surface of the foam panel 70 to thereby form a wall structure 10 having a foam layer 30 deposited in the cavity 18 in which the foam layer 30 penetrates mesh 90 and adheres to foam panel 70. As indicated earlier, however, the foam layer 30 does not necessarily encapsulate the mesh 90.

Various spray application devices can be used to spray the foam composition into the cavity 18. One suitable device is a Fusion CS plural-component spray gun commercially available from Graco Inc. As will be appreciated, polyurethane foam is formed from combining a polyol component that typically comprises one or more polyols and other additives, such as blowing agents and flame retardants, among others, and a polyisocyanate component. In these cases, it is often desirable that the polyol component and polyisocyanate component be metered and mixed in a plural-component spray gun at a 1:1 volume ratio.

Examples of foam materials that can be used as foam layer 30 include, but are not limited to, the materials described earlier in this specification. In some implementations, the foam layer 30 is spray applied such that it has a thickness extending from the rear surface of the foam panel 70 to a position intermediate the front frame surface 11*a* and the rear frame surface 11*b*. In this manner, a gap 40 is formed within the frame 11 between a rear surface of the foam layer 30 and the rear frame surface 11*b*. In some embodiments, the gap 40 has a width, from the rear surface of the foam layer 30*b* to the rear frame surface 11*b*, of at least 1 inch (2.54 cm), such as 1 to 4.5 inches (2.54 to 11.43 cm), 1 to 2 inches (2.54 to 5.08 cm) or 1.5 to 2 inches (3.81 to 5.08 cm). In some embodiments, the foam layer 30 is deposited as a substantially continuous layer within the cavity 18 to provide optimal insulating properties. The gap 40 can be used as an area to incorporate home utility components such as electrical wires, cords, heating and cooling pipes, and plumbing fixtures. These home utility components may be inserted into the gap 40 located between the foam layer 30 and the rear frame surface 11*b* such that utilities components are not surrounded by or contacting the foam layer 30. In one example, the gap 40 comprises at least two inches as measured between the foam layer 30 and the rear frame surface 11b.

The foam layer 30 is thus formed in-situ during the manufacturing process of the wall structure 10. The term "formed in-situ during the manufacturing process," as used in this specification, refers to the formation of a foam layer 30 as described in this specification during manufacturing of the wall structure 10 off-site at a facility remote or away from a building construction site. As such, the foam layer 30 may be formed not at a construction site as is required by conventional methods, but instead as a component of the pre-fabricated foamed wall structure 10.

The foam layer 30 is able to fill tight spaces and seal gaps that may not be visible to the naked eye. The foam layer 30 can also act as a vapor and thermal insulating barrier, which reduces energy consumption in buildings and residential homes when the wall structure 10 is used as a constituent wall panel. The foam layer 30 may provide structural stability to the wall structure 10, such as improved wall racking strength, which refers to the ability of a wall structure to maintain its shape under shear stress.

After the foam layer 30 has expanded and cured, the substantially upright positioned wall structure 10 can be conveyed out of the spray foam application station on the track conveyer. Thereafter, if desired, the foam layer 30 can be deflashed to remove excess foam material, such as any foam material that is deposited on the rear frame surface 11b. Deflashing can, in some embodiments, be done while the wall structure 10 is in a substantially upright position on the track conveyer. Various devices can be used for deflashing, such as a hoe or curry comb, among others.

In cases where the wall structure 10 comprises two or more foam panels 70 adjacent with one another. A sealant, such as a tape (or other sealant material, such as a liquid sealer) can be applied to front surfaces of the foam panels 70 and over seams formed at adjacent sides of two foam panels 70.

Various aspects of the subject matter described herein are set out in the following numbered clauses:

Clause 1. A wall structure comprising: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a mesh mechanically fastened to the front frame surface; (c) a foam panel comprising a facer on at least a rear face of a core foam layer, wherein the facer abuts and overlies the mesh, wherein the foam panel, the mesh, the first member, the second member, and the connecting members define a cavity; and (d) a foam layer disposed within the cavity, wherein the foam layer penetrates the mesh and adheres to the foam panel.

Clause 2. The wall structure of clause 1, wherein the first member, the second member, and the connecting members comprise wooden 2×4 members secured together with fasteners, such as nails, nail plates, screws, staples, bolts, or rivets, or a combination of any thereof.

Clause 3. The wall structure of clause 1 or clause 2, wherein the mesh comprises a metal, a metal alloy, a thermoset polymer, such as nylon, a thermoplastic polymer, such as polyethylene, an organic or inorganic woven or non-woven material.

Clause 4. The wall structure of one of clause 1 to clause 3, wherein the mesh comprises an expanded metal (such as carbon steel, aluminum or stainless steel), glass fibers, or a plastic.

Clause 5. The wall structure of one of clause 1 to clause 4, wherein the mesh comprises apertures having a square, diamond, rhombus, or hexagonal pattern.

Clause 6. The wall structure of clause 5, wherein the mesh has a thickness of 0.005 to 0.2 inch (0.127 to 5.08 millimeters), such as 0.01 to 0.1 inch (0.254 to 2.54 millimeters) or 0.02 to 0.05 inch (0.508 to 1.27 millimeters) and/or the apertures of the mesh have a size of 0.25 to 1 inch (6.35 to 25.4 millimeters) or 0.25 to 0.75 inch (6.35 to 19.05 millimeters) in the longest-dimension thereof.

Clause 7. The wall structure of one of clause 1 to clause 6, wherein the mesh is mechanically fastened to the front frame surface with nails, staples, screws, bolts, or rivets, or a combination of any thereof.

Clause 8. The wall structure of one of clause 1 to clause 7, wherein the core foam layer comprises a closed-celled foam.

Clause 9. The wall structure of one of clause 1 to clause 8, wherein the core foam layer comprises a rigid foam.

Clause 10. The wall structure of one of clause 1 to clause 9, wherein the foam panel has a thickness of no more than 2 inches (5.08 cm), such as 1 to 2 inches (2.54 to 5.08 cm) or 1 to 1.5 inches (2.54 cm to 3.81 cm).

Clause 11. The wall structure of one of clause 1 to clause 10, wherein the core foam layer comprises a polyisocyanurate foam layer, an expanded polystyrene foam layer or an extruded polystyrene foam layer, and the facer comprises a fiberglass mat, a coated fiberglass mat, a glass fiber-reinforced cellulosic felt, a coated and polymer-bonded fiber mats, a foil, such as aluminum foil, a coated foil, a foil/membrane laminate, a foil/glass composite, or a polyolefin film.

Clause 12. The wall structure of one of clause 1 to clause 11, wherein the foam panel is fastened to the front frame surface with mechanical fasteners, such as nails, staples, screws, bolts, or rivets, or a combination of any thereof, and/or an adhesive, such as a foam material.

Clause 13. The wall structure of one of clause 1 to clause 12, wherein the foam layer does not extend out from and/or overlie the front frame surface.

Clause 14. The wall structure of one of clause 1 to clause 13, wherein the foam layer comprises polyurethane, polyurea, or polyisocyanurate, or a mixture thereof.

Clause 15. The wall structure of one of clause 1 to clause 14, wherein the foam layer has a density of at least 2.8 lb/ft$^3$ (44.9 kg/m$^3$), such as 2.8 to 4.0 lb/ft$^3$ (44.9 to 64.1 kg/m3), 3.0 to 4.0 lb/ft$^3$ (48.1 to 64.1 kg/m$^3$), 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

Clause 16. The wall structure of one of clause 1 to clause 15, wherein the foam layer has a thickness extending from the rear surface of the foam panel to a position intermediate the front frame surface and the rear frame surface, such that a gap is formed within the frame between a rear surface of the foam layer and the rear frame surface, such as where the gap has a width, from the rear surface of the foam layer to the rear frame surface, of at least 1 inch (2.54 cm), such as 1 to 2 inches (2.54 to 5.08 cm) or 1.5 to 2 inches (3.81 to 5.08 cm).

Clause 17. A method for manufacturing a wall structure, comprising: (a) mechanically fastening a mesh to a front surface of a frame, wherein the front frame surface is formed by a front surface of a first member, a front surface of a second member that is spaced apart from the first member, and a front surface of connecting members extending between the first member and the second member; (b) orienting a foam panel so that the foam panel abuts and overlies the mesh so that the foam panel, the mesh, the first member, the second member, and the connecting members define a cavity, wherein the foam panel comprises a facer on at least a rear face of a core foam layer; and (c) depositing a foam-forming material into the cavity so that the foam-forming material forms a foam layer that penetrates the mesh and adheres to the rear surface of the foam panel.

Clause 18. The method of clause 17, wherein the first member, the second member, and the connecting members comprise wooden 2×4 members secured together with fasteners, such as nails, nail plates, screws, staples, bolts, or rivets, or a combination of any thereof.

Clause 19. The method of clause 17 or clause 18, wherein the mesh comprises a metal, a metal alloy, a thermoset polymer, such as nylon, a thermoplastic polymer, such as polyethylene, an organic or inorganic woven or non-woven material.

Clause 20. The method of one of clause 17 to clause 19, wherein the mesh comprises an expanded metal (such as carbon steel, aluminum, or stainless steel), a hardware cloth, glass fibers, or a plastic.

Clause 21. The method of one of clause 17 to clause 20, wherein the mesh comprises apertures having a square, diamond, rhombus, or hexagonal pattern.

Clause 22. The method of clause 21, wherein the mesh has a thickness of 0.005 to 0.2 inch (0.127 to 5.08 millimeters), such as 0.01 to 0.1 inch (0.254 to 2.54 millimeters) or 0.02 to 0.05 inch (0.508 to 1.27 millimeters) and/or the apertures of the mesh have a size of 0.25 to 1 inch (6.35 to 25.4 millimeters) or 0.25 to 0.75 inch (6.35 to 19.05 millimeters) in the longest-dimension thereof.

Clause 23. The method of one of clause 17 to clause 22, wherein the mesh is mechanically fastened to the front frame surface with nails, staples, screws, bolts, or rivets, or a combination of any thereof.

Clause 24. The method one of clause 17 to clause 23, wherein the core foam layer comprises a closed-celled foam.

Clause 25. The method of one of clause 17 to clause 24, wherein the core foam layer comprises a rigid foam.

Clause 26. The method of one of clause 17 to clause 25, wherein the foam panel has a thickness of no more than 2 inches (5.08 cm), such as 1 to 2 inches (2.54 to 5.08 cm) or 1 to 1.5 inches (2.54 cm to 3.81 cm).

Clause 27. The method of one of clause 17 to clause 26, wherein the core foam layer comprises a polyisocyanurate foam layer, an expanded polystyrene foam layer or an extruded polystyrene foam layer, and the facer comprises a fiberglass mat, a coated fiberglass mat, a glass fiber-reinforced cellulosic felt, a coated and polymer-bonded fiber mats, a foil, such as aluminum foil, a coated foil, a foil/membrane laminate, a foil/glass composite, or a polyolefin film.

Clause 28. The method of one of clause 17 to clause 27, wherein the foam panel is attached to the front frame surface with mechanical fasteners, such as nails, staples, screws, bolts, or rivets, or a combination of any thereof, and/or an adhesive, such as a foam material.

Clause 29. The method of one of clause 17 to clause 28, wherein the foam layer comprises polyurethane, polyurea, or polyisocyanurate, or a mixture thereof.

Clause 30. The method of one of clause 17 to clause 29, wherein the foam layer does not extend out from and/or overlie the front frame surface.

Clause 31. The method of one of clause 17 to clause 30, wherein the foam layer has a density of at least 2.8 lb/ft$^3$ (44.9 kg/m$^3$), such as 2.8 to 4.0 lb/ft$^3$ (44.9 to 64.1 kg/m3), 3.0 to 4.0 lb/ft$^3$ (48.1 to 64.1 kg/m$^3$), 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

Clause 32. The method of one of clause 17 to clause 31, wherein the foam layer has a thickness extending from the rear surface of the foam panel to a position intermediate the front frame surface and the rear frame surface, such that a gap is formed within the frame between a rear surface of the foam layer and the rear frame surface, such as where the gap has a width, from the rear surface of the foam layer to the rear frame surface, of at least 1 inch (2.54 cm), such as 1 to 2 inches (2.54 to 5.08 cm) or 1.5 to 2 inches (3.81 to 5.08 cm).

Clause 33. The method of one of clause 17 to clause 32, wherein the mesh is mechanically fastened to the front frame surface while the frame is positioned substantially horizontally, such as where the frame is positioned on a framing table where the frame may be constructed.

Clause 34. The method of one of clause 17 to clause 33, wherein the mesh is mechanically fastened to front faces of the first and second members and/or to front faces of the connecting members extending therebetween.

Clause 35. The method of one of clause 17 to clause 34, wherein the foam panel is fastened to the front frame surface of a substantially horizontally positioned frame.

Clause 36. The method of one of clause 17 to clause 35, wherein the foam panel is fastened to front faces of the first and second members and/or to front faces of the connecting members extending therebetween.

Clause 37. The method of one of clause 17 to clause 36, wherein the frame having the mesh and foam panel fastened thereto is placed on a conveyor, such as a track conveyor, that is configured to convey the frame having the mesh and foam panel fastened thereto in a substantially upright position, such as where the track conveyor comprises rollers, balls, bearings, wheels, and/or a belt.

Clause 38. The method of clause 37, wherein the frame is placed on a track conveyor in a substantially upright position in which rear frame surface faces away from a substantially horizontally positioned track(s) of the track conveyor, so that it is completely exposed.

Clause 39. The method of clause 37 or clause 38 wherein the track conveyor conveys the frame in a substantially upright position to a spray foam application station where the foam-forming material is spray applied into the cavity, such as where the foam-forming material is formed by combining a polyol component that comprises one or more polyols and additives, such as blowing agents and flame retardants, and a polyisocyanate component, at a 1:1 volume ratio.

Clause 40. A building comprising: (1) a first wall structure comprising: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a mesh mechanically fastened to the front frame surface; (c) a foam panel that overlies the mesh, wherein the foam panel, the mesh, the first member, the second member, and the connecting members define a cavity; and (d) a foam layer disposed within the cavity, wherein the foam layer penetrates the mesh and adheres to the foam panel; and (2) a second wall structure disposed adjacent to the first wall structure, wherein (i) the second wall structure does not include a mesh fastened to a front frame surface, and (ii) the difference in the thickness of the first wall structure and the second wall structure is no more than 0.2 inch (5.08 millimeters).

Clause 41. The building of clause 40, wherein the second wall structure comprises: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel fastened to at least a portion of the front frame surface, wherein the foam panel, the first member, the second member, and the connecting members define a cavity; and (c) a foam layer disposed within the cavity, wherein the foam layer adheres to the foam panel.

Clause 42. The building of clause 40 or clause 41, wherein the foam panel of the first wall structure abuts the mesh.

Clause 43. The building of clause 41 or clause 42, wherein the first member, the second member, and the connecting members of at least one of the first wall structure and the second wall structure comprise wooden 2×4 members secured together with fasteners, such as nails, nail plates, screws, staples, bolts, or rivets, or a combination of any thereof.

Clause 44. The building of one of clause 40 to clause 43, wherein the mesh comprises a metal, a metal alloy, a thermoset polymer, such as nylon, a thermoplastic polymer, such as polyethylene, an organic or inorganic woven or non-woven material.

Clause 45. The building of one of clause 40 to clause 44, wherein the mesh comprises an expanded metal (such as carbon steel, aluminum or stainless steel), glass fibers, or a plastic.

Clause 46. The building of one of clause 40 to clause 45, wherein the mesh comprises apertures having a square, diamond, rhombus, or hexagonal pattern.

Clause 47. The building of one of clause 40 to clause 46, wherein the mesh has a thickness of 0.005 to 0.2 inch (0.127 to 5.08 millimeters), such as 0.01 to 0.1 inch (0.254 to 2.54 millimeters) or 0.02 to 0.05 inch (0.508 to 1.27 millimeters) and/or the apertures of the mesh have a size of 0.25 to 1 inch (6.35 to 25.4 millimeters) or 0.25 to 0.75 inch (6.35 to 19.05 millimeters) in the longest-dimension thereof.

Clause 48. The building one of clause 40 to clause 47, wherein the mesh is mechanically fastened to the front frame surface with mechanical fasteners, such as nails, staples, screws, bolts, or rivets, or a combination of any thereof.

Clause 49. The building of one of clause 41 to clause 48, wherein the foam panel of at least one of the first wall structure and the second wall structure comprises a core foam layer comprising a closed-celled foam.

Clause 50. The building of one of clause 41 to clause 49, wherein the foam panel of at least one of the first wall structure and the second wall structure comprises a core foam layer comprising a rigid foam.

Clause 51. The building one of clause 41 to clause 50, wherein the foam panel of at least one of the first wall structure and the second wall structure has a thickness of no more than 2 inches (5.08 cm), such as 1 to 2 inches (2.54 to 5.08 cm) or 1 to 1.5 inches (2.54 cm to 3.81 cm).

Clause 52. The building of one of clause 41 to clause 51, wherein the foam panel of at least one of the first wall structure and the second wall structure comprises a facer on the rear face and/or the front face of a core foam layer, such as where the core foam layer comprises a polyisocyanurate foam layer, an expanded polystyrene foam layer or an extruded polystyrene foam layer, and the facer attached to a front face and/or a rear face of the core foam layer comprises a fiberglass mat, a coated fiberglass mat, a glass fiber-reinforced cellulosic felt, a coated and polymer-bonded fiber mats, a foil, such as aluminum foil, a coated foil, a foil/membrane laminate, a foil/glass composite, or a polyolefin film.

Clause 53. The building of one of clause 41 to clause 52, wherein the foam panel of at least one of the first wall structure and the second wall structure is fastened to the front frame surface with fasteners, such as nails, staples, screws, bolts, or rivets, or a combination of any thereof, and/or an adhesive, such as a foam material.

Clause 54. The building of one of clause 41 to clause 53, wherein the foam layer of at least one of the first wall structure and the second wall structure does not extend out from and/or overlie the front frame surface.

Clause 55. The building of one of clause 41 to clause 54, wherein the foam layer of at least one of the first wall structure and the second wall structure comprises polyurethane, polyurea, or polyisocyanurate, or a mixture thereof.

Clause 56. The building of one of clause 41 to clause 55, wherein the foam layer of at least one of the first wall structure and the second wall structure has a density of at least 2.8 lb/ft$^3$ (44.9 kg/m$^3$), such as 2.8 to 4.0 lb/ft$^3$ (44.9 to 64.1 kg/m3), 3.0 to 4.0 lb/ft$^3$ (48.1 to 64.1 kg/m$^3$), 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

Clause 57. The building of one of clause 41 to clause 56, wherein the foam layer of at least one of the first wall structure and the second wall structure has a thickness extending from the rear surface of the foam panel to a position intermediate the front frame surface and the rear frame surface, such that a gap is formed within the frame between a rear surface of the foam layer and the rear frame surface, such as where the gap has a width, from the rear surface of the foam layer to the rear frame surface, of at least 1 inch (2.54 cm), such as 1 to 2 inches (2.54 to 5.08 cm) or 1.5 to 2 inches (3.81 to 5.08 cm).

The non-limiting and non-exhaustive examples that follow are intended to further describe various non-limiting and non-exhaustive embodiments without restricting the scope of the embodiments described in this specification.

EXAMPLES

Example 1

Wall assemblies were created by attaching metal mesh to an 8 foot wide by 8 foot tall wall frame made with 2×4 lumber and 16 inch on center stud spacing. Metal mesh was fastened to all horizontal and vertical stud faces using staples (1" crown, 1-¼" leg) at 3" spacing. Once the mesh was attached, a rigid insulation panel composed of a closed-celled polyisocyanurate foam core having coated glass facers on both sides (commercially available as Hunter Panels Xci CG from Hunter Panels, Portland, Me.) was fastened over it using button cap nails (12"/24" edge/field spacing). Next, a polyurethane foam forming-composition (commercially available as Hunter PW-STR from Hunter Panels, Portland, Me.) was sprayed into the stud cavities to provide a closed-celled polyurethane foam (cc-SPF) having a density of about 3.2 lb/ft$^3$ (51.3 kg/m$^3$) and a nominal foam thickness of 1-½".

Two types of metal mesh were tested: (1) Hardware cloth (HC)—19 gauge galvanized wire welded at ½" mesh spacing. The HC was packaged as a 24"×100' roll. Four 24"×8' ft sections were applied, with the long dimension spanning the width of the 8' stud wall. (2) Expanded galvanized metal lath (EML), purchased in 27"×8' sheets. The lath had diamond shaped holes that were approximately 0.25"×0.50" and ⅛" thick. Four sheets were applied to each stud wall, with the long dimension spanning the width. Overhang at the top of the stud wall was ground off.

In addition to assemblies made as described above. Comparative wall structures were also made with no mesh, and no spray foam. The results are set forth in Table 1

TABLE 1

| Example | Sheathing Type | Metal Mesh Type | Spray Foam Type | Replicate | Strength, lbs | Strength, plf | Ductility, mm |
|---|---|---|---|---|---|---|---|
| 1A (comparative) | 1" thick polyiso board | none | 1.5" thick cc-SPF | 1 | 2586 | 323 | 96 |
|  |  |  |  | 2 | 2870 | 359 | 75 |
|  |  |  |  | Avg | 2728 | 341 | 86 |
| 1B | 1" thick polyiso board | EML | 1.5" thick cc-SPF | 1 | 6580 | 823 | >130 |
|  |  |  |  | 2 | 5133 | 642 | >130 |
|  |  |  |  | Avg | 5857 | 732 | >130 |
| 1C | 1" thick polyiso board | HC | 1.5" thick cc-SPF | 1 | 6258 | 782 | >130 |
|  |  |  |  | 2 | 6952 | 869 | >130 |
|  |  |  |  | Avg | 6605 | 826 | >130 |
| 1D (comparative) | 1" thick polyiso board | EML | none | 1 | 1721 | 215 | >130 |
|  |  |  |  | 2 | 1502 | 188 | 124 |
|  |  |  |  | Avg | 1612 | 201 | 128 |

Note that the comparative wall assembly of Example 1A (utilizing SPF but no metal mesh) had average ultimate strength of 341 lbs/linear foot, and displacement of 86 mm when crossing the 80% post-max decline. The comparative wall assemblies of Example 1D (made with a metal mesh but no cc-SPF) were not as strong, with an average ultimate shear strength of only 201 lbs/linear ft. However, these walls were significantly more ductile, with an average displacement of 128 cm at the 80% threshold during post-max decline.

One might suppose based on the results from the two comparative wall assemblies that evaluated SPF and metal mesh independently, that combining metal mesh and SPF into the wall assembly might produce an ultimate racking strength that would, at best, be additive of the result from the two independent assemblies (i.e., about 542 lbs/linear foot). Surprisingly, the average ultimate strength of the inventive wall assemblies of Examples 1B and 1C significantly exceeded the combined value of those two wall assemblies (732 lbs/linear foot for Example 1B and 826 lbs/linear ft for Example 1C). This is a synergistic result.

In addition, when considering ductility of the wall assembly, it would be reasonable to expect that the displacement of the inventive wall assemblies at the 80% post-max threshold might align with observed results for Example 1A (made with SPF but no metal mesh because it is a significantly stronger wall assembly than Example 1D which was made with metal mesh but no SPF). Instead, it was observed that the displacement of the inventive wall assemblies (Examples 1B and 1C) was essentially aligned with the weaker wall assembly of Example 1D. Again, this appeared to be a synergistic result.

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A foam wall structure comprising:
   (a) a frame comprising:
      (i) a first member;
      (ii) a second member spaced apart from the first member; and
      (iii) connecting members extending between the first member and the second member, wherein the first member, the second member, and the connecting members each comprise a front surface and a rear surface that form a front frame surface and a rear frame surface;
   (b) a mesh mechanically fastened to the front frame surface, wherein the mesh overlies and abuts the front frame surface;
   (c) a foam panel comprising a facer on at least a rear face of a core foam layer, wherein the facer on the rear face of the core foam layer abuts and overlies the mesh, wherein the foam panel, the mesh, the first member, the second member, and the connecting members define a cavity; and
   (d) a foam layer disposed within the cavity, wherein the foam layer penetrates the mesh and adheres to the foam panel.

2. The foam wall structure of claim 1, wherein the mesh comprises an expanded metal.

3. The foam wall structure of claim 1, wherein the core foam layer comprises a polyisocyanurate foam.

4. The foam wall structure of claim 1, wherein the facer comprises a coated fiberglass mat, a fiberglass mat, a glass fiber-reinforced cellulosic felt, a coated and polymer-bonded fiber mat, a foil, a coated foil, a foil/membrane laminate, a foil/glass composite, or a polyolefin film.

5. The foam wall structure of claim 1, wherein the foam panel is fastened to the front frame surface with mechanical fasteners.

6. The foam wall structure of claim 1, wherein the foam layer does not overlie the front frame surface.

7. The foam wall structure of claim 1, wherein the foam layer comprises polyurethane foam having a density of at least 2.8 lb/ft$^3$ (44.9 kg/m$^3$), when measured according to ASTM D1622-08.

8. The foam wall structure of claim 1, wherein the facer on the rear face of the core foam layer is a water resistant facer.

9. A method for manufacturing a wall structure, comprising:
   (a) mechanically fastening a mesh to a front surface of a frame, wherein the front frame surface is formed by a front surface of a first member, a front surface of a second member that is spaced apart from the first member, and a front surface of connecting members extending between the first member and the second member, so that the mesh overlies and abuts the front frame surface;
   (b) orienting a foam panel so as to abut and overlie the mesh so that the foam panel, the mesh, the first member, the second member, and the connecting members define a cavity, wherein the foam panel comprises a facer on at least a rear face of a core foam layer, wherein the facer on the rear face of the core foam layer abuts and overlies the mesh; and
   (c) depositing a foam-forming material into the cavity so that the foam-forming material forms a foam layer that penetrates the mesh and adheres to a rear surface of the foam panel.

10. The method of claim 9, wherein the mesh comprises an expanded metal.

11. The method of claim 9, wherein the core foam layer comprises a polyisocyanurate foam and the facer comprises a fiberglass mat, a coated fiberglass mat, a glass fiber-reinforced cellulosic felt, a coated and polymer-bonded fiber mat, a foil, a coated foil, a foil/membrane laminate, a foil/glass composite, or a polyolefin film.

12. The method of claim 9, further comprising fastening the foam panel to the front frame surface with mechanical fasteners.

13. The method of claim 9, wherein the foam-forming material is deposited into the cavity such that the foam layer does not overlie the front frame surface.

14. The method of claim 9, wherein the foam layer comprises polyurethane foam having a density of at least 2.8 lb/ft$^3$ (44.9 kg/m$^3$), when measured according to ASTM D1622-08.

15. The method of claim 9, wherein the facer on the rear face of the core foam layer is a water resistant facer.

16. A building comprising:
   (1) a first wall structure comprising:
      (a) a frame comprising:
         (i) a first member;
         (ii) a second member spaced apart from the first member; and
         (iii) connecting members extending between the first member and the second member, wherein the first member, the second member, and the connecting members each comprise a front surface and a rear surface that form a front frame surface and a rear frame surface;
      (b) a mesh mechanically fastened to the front frame surface, wherein the mesh overlies and abuts the front frame surface;
      (c) a foam panel that overlies the mesh, wherein the foam panel, the mesh, the first member, the second member, and the connecting members define a cavity, wherein the foam panel comprises a facer on at least a rear face of a core foam layer, wherein the facer on the rear face of the core foam layer abuts and overlies the mesh; and
      (d) a foam layer disposed within the cavity, wherein the foam layer penetrates the mesh and adheres to the foam panel; and
   (2) a second wall structure disposed adjacent to the first wall structure, wherein
      (i) the second wall structure does not include a mesh fastened to a front frame surface, and
      (ii) the difference in the thickness of the first wall structure and the second wall structure is no more than 0.2 inch (5.08 millimeters).

17. The building of claim 16, wherein the second wall structure comprises:
   (a) a frame comprising:
      (i) a first member;
      (ii) a second member spaced apart from the first member; and
      (iii) connecting members extending between the first member and the second member, wherein the first member, the second member, and the connecting members each comprise a front surface and a rear surface that form a front frame surface and a rear frame surface;

(b) a foam panel fastened to at least a portion of the front frame surface, wherein the foam panel, the first member, the second member, and the connecting members define a cavity; and (c) a foam layer disposed within the cavity, wherein the foam layer adheres to the foam panel.

18. The building of claim 16, wherein the foam panel of the first wall structure abuts the mesh.

19. The building of claim 16, wherein the difference in the thickness of the first wall structure and the second wall structure is no more than 0.05 inch (1.27 millimeters).

20. The building of claim 16, wherein the facer on the rear face of the core foam layer is a water resistant facer.

* * * * *